(12) United States Patent
Nelson

(10) Patent No.: US 7,018,501 B1
(45) Date of Patent: Mar. 28, 2006

(54) ONE-WAY SEE-THRU PANEL AND METHOD OF MAKING SAME

(76) Inventor: Stephen G. Nelson, 4819 E. Calle Redonda, Phoenix, AZ (US) 85018

(*) Notice: Subject to any disclaimer, the term of this patent is extended or adjusted under 35 U.S.C. 154(b) by 0 days.

(21) Appl. No.: 10/812,649

(22) Filed: Mar. 29, 2004

Related U.S. Application Data

(63) Continuation of application No. 09/899,688, filed on Jul. 5, 2001, now abandoned.

(51) Int. Cl.
*B32B 31/00* (2006.01)

(52) U.S. Cl. .................... 156/253; 156/252; 156/268; 156/278; 156/280; 156/594; 156/615

(58) Field of Classification Search ............... 156/277, 156/252, 253, 256, 268, 278, 280; 40/594, 40/615; 428/42.1, 41.6, 41.7, 41.8, 201, 428/202, 203, 204, 137, 138
See application file for complete search history.

(56) References Cited

U.S. PATENT DOCUMENTS

| | | | |
|---|---|---|---|
| 5,002,825 A | 3/1991 | Mimura et al. | |
| 5,550,346 A | 8/1996 | Andriash et al. | |
| 5,609,938 A | 3/1997 | Shields | |
| 5,679,435 A | 10/1997 | Andriash | |
| 5,765,153 A | 6/1998 | Benantar et al. | |
| 5,773,110 A | 6/1998 | Shields | |
| 5,803,529 A | 9/1998 | Perry-Bores et al. | |
| 5,925,437 A | 7/1999 | Nelson | |
| 2002/0004131 A1* | 1/2002 | Darsillo et al. | 428/328 |

* cited by examiner

*Primary Examiner*—Linda Gray
(74) *Attorney, Agent, or Firm*—Gregory J. Nelson

(57) ABSTRACT

A see-through, one-way panel having a white opaque substrate with a dark pigmented adhesive on the rear side. The pigmented adhesive is covered with a release liner. The substrate, adhesive and liner are perforated and thereafter an imperforate barrier is laminated over the release liner. The front surface may be top coated to accept a dye based ink. The front surface is printed with an image by thermal or piezo ink jet printing technology. The resulting panel may then be adhesively applied to a surface.

11 Claims, 2 Drawing Sheets

ONE-WAY SEE-THRU PANEL AND METHOD OF MAKING SAME

CROSS-REFERENCE IS MADE TO RELATED APPLICATION

This application is a continuation application of patent application Ser. No. 09/899,688, filed Jul. 5, 2001, abandoned, of the same title.

BACKGROUND OF THE INVENTION

See-thru or one-way films have become well known and are used for various purposes, mainly advertising displays. Most see-thru films are fabricated having a substrate which is perforated and which is coated on one side with a black pigment. The opposite side is white opaque and printed with an image and conventional practice is to print the image by use of silkscreening or lithography. The perforations permit viewing in one direction which is substantially unobstructed. The white opaque surface receives the image which is viewable from the opposite side. For example, see U.S. Pat. Nos. 4,883,556 and 4,940,622 to Leavitt which teach silkscreening a perforated substrate. Similarly, U.S. Pat. No. 5,525,177 teaches a printing or image transfer method using an electrostatic process in which a reverse image is transferred to a surface of a perforated membrane.

BACKGROUND OF THE INVENTION

The problem with using conventional printing methods such as screen printing is that screen printing is not cost effective for short runs, is time consuming and the resulting product while acceptable, does not have a high quality of resolution. Also, screen printing images cannot be tiled for unique one-of-a-kind graphics. Similarly, deficiencies exist with electrostatic processes.

Electrostatic printing is applicable to short-run graphics. However, the equipment necessary for electrostatic printing is much more expensive than silkscreening, thermal or piezo ink jet printing and is more complicated involving the use of a laminator to transfer the printed image to an electrostatically charged substrate.

The present invention relates to an improved method for producing or imaging see-thru panels or films with ink jet technology. See-thru films have the advantage that an image may be applied and viewed from one side and, because of the perforations, substantial light passes through the film allowing the viewer relatively unobstructed vision from the opposite side. Thus, see-thru films are widely used on such advertising applications as the signage applied to the sides of vehicles such as buses, allowing the passengers a relatively unobstructed view. See-thru films are also used where visibility for security purposes is important. Glass panels such as windows and cooler cases are other typical applications for these types of film.

BRIEF SUMMARY OF THE INVENTION

Briefly, the present invention provides a high resolution, see-thru, one-way vision panel manufactured using an opaque substrate which may be polyester, vinyl or a polyolefin and which is outdoor durable. Preferably the substrate is pigmented with a white opaque pigment. The substrate is coated on one side, the rear side, with a black pigmented adhesive which is protected by a release liner such as silicon coated paper. Once the adhesive and release liner are applied, the substrate is perforated to create a distinct hole pattern. The perforations can be accomplished by using a mechanical or laser perforating process. Typically, the hole pattern consists of 1/16" diameter holes which are staggered 3/32" from one another but other patterns may be applied. The opposite or front side of the substrate is chemically treated to encapsulate dyes and pigmented inks. Synthetic films, such as polyesters and vinyls which are not top-coated, will not absorb certain types of ink, particularly dye based and pigmented inks. Top coatings such as clays, resins, gels and latex combination coatings are best. Another embodiment of the invention involves the application of solvent based inks to form an image on the substrate, the application of which does not require top coating.

BRIEF DESCRIPTION OF THE DRAWINGS

Turning now to the drawings, FIGS. 1 and 2 show a cross section of a typical panel 10 according to the invention. The panel 10 includes a substrate 12 which is a polymeric film such as a polyester or preferably vinyl sheet material having a typical thickness of 4 mils. The substrate 12 may be transparent or opaque although opaque having a white colorization is preferred. In lieu of using an opaque substrate, the front surface may be flood coated with a white or light reflecting screen printing or the like.

Figure 1:
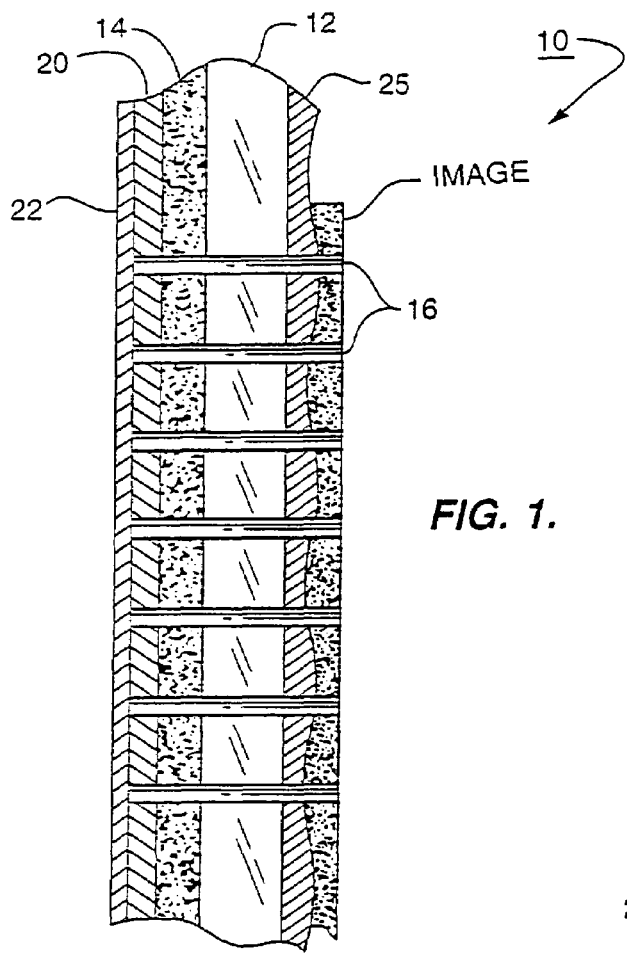
FIG. 1 is a cross-sectional view showing a one-way panel manufactured and imaged according to the invention.
Figure 2:
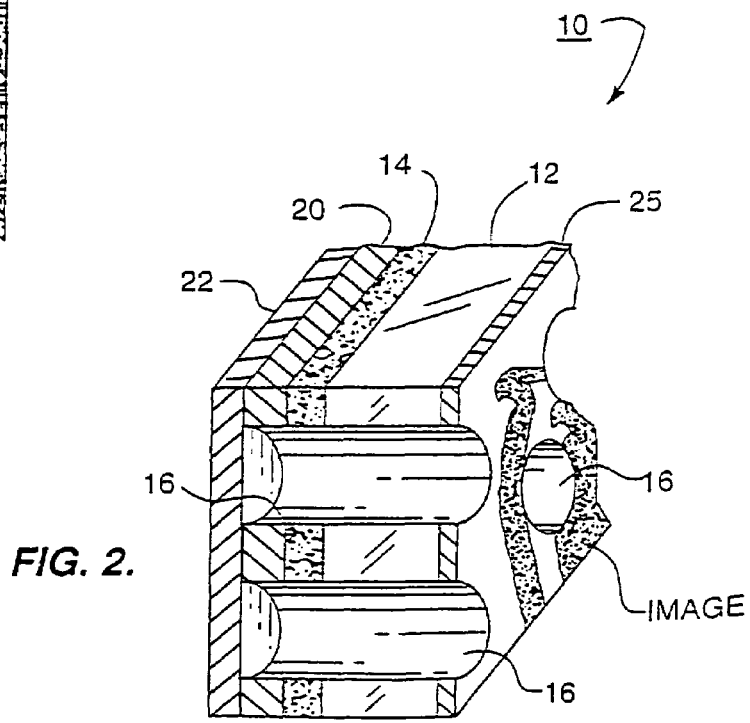
FIG. 2 is an enlarged cross-sectional view of the panel shown in FIG. 1.

The rear surface is coated with an adhesive layer 14. "Rear" as used herein refers to the surface which would normally be applied to a surface such as glass store front as signage. The image is viewed from the front and when the panel 10 is viewed from the rear, see-through vision is provided due to passage of light through perforations 16. The image on the front is not visible from the rear.

The adhesive layer 14 is pigmented with a black or light-absorbing pigment. The adhesive is preferably an acrylic adhesive which may be applied by conventional methods such as rolling or spraying. The adhesive layer 14 is then covered with a peelable release liner 20 such as a silicone coated paper which is removed to expose the adhesive at the time of application. The liner 20 is generally roll fed and applied by a pressure roller.

Perforations 16 extend through the release liner and the release liner is backed with a barrier film 22 which prevents bleed through of inks when the image is applied. Both the release liner 20 and barrier 22 are removed at the time the panel is installed. The front surface is then top coated with a coating 25 which will absorb ink of the type applied by jet inks and enhance UV durability, stability and weather resistance. Dye-based ink jet inks are not generally used for outdoor applications because of their tendency to fade in sunlight and to be detrimentally effected by water. With the present invention, ink jet printing techniques, either piezo or thermal, which are fast and less expensive than e-stat, can be utilized for applications such as exterior signs and particularly one-way vision panels.

The top coating may be selected from various materials which adhere to the polymeric substrate and which will absorb and encapsulate the inkjet dye. Representative of such top coats are clays, gels and resins such those manufactured by Precision Coatings, Inc. under the Renaissance™ trademark. American Coating Technology also markets a similar coating designated Protecoat Formulation #4119.

After top coating, the assembly is perforated using either conventional mechanical punching with dies or punches or by laser perforating in the desired pattern as described more fully in U.S. Pat. No. 5,550,346.

After perforating, an imperforate barrier 22 is applied to the rear of the assembly. The barrier 22 and release liner 20 will be removed at the time of application. However, the barrier 22 prevents spray through of dyes at the time the image is applied to the front surface. Also, use of the imperforate barrier facilitates handling of the material by use of vacuum tables and equipment thus making handling much more efficient.

Figure 3:
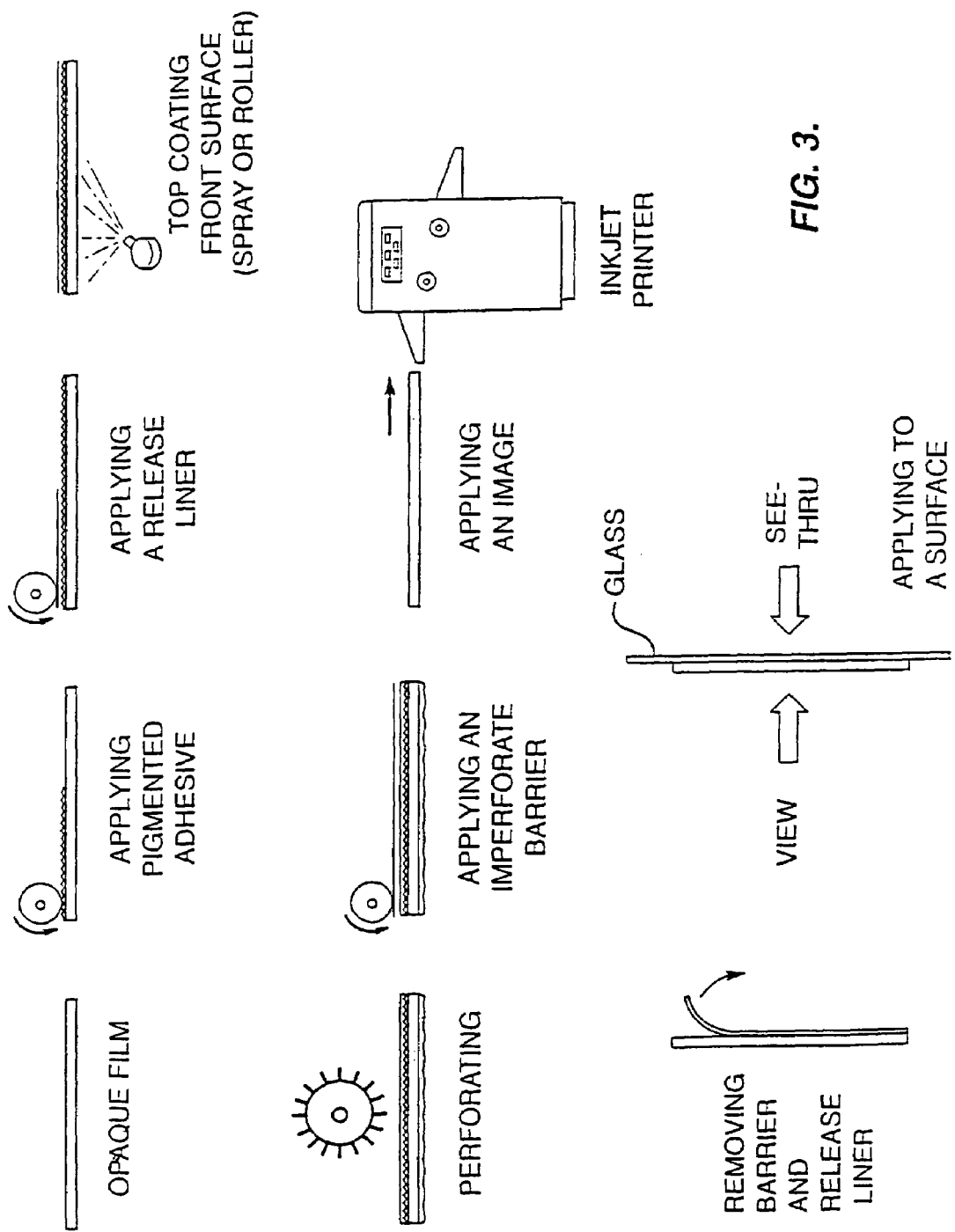
FIG. 3 is a schematic diagram of the method of the invention.

FIG. 3 illustrates the process described above in schematic format.

The following are examples of one-way, see-through substrates manufactured according to the present invention:

EXAMPLE 1

A top-coated polyester of the type manufactured by Sumner & Taylor, a member of the SIHL Group, designated Photomatte Waterproof PMW was utilized. The pigmented acrylic based adhesive of the type manufactured by Mac-Tac was gravure-coated on the back of the film and laminated with a suitable release liner, in this case 110# silicone coated paper.

Thereafter, the substrate with attached release liner and adhesive was perforated using a mechanical perforating die to apply a hole pattern of 1/16" diameter holes staggered on 3/32" centers. After laminating, a nonperforated backing was applied to the back or exposed side of the release paper. The backing was a 1.7 mil. polyester. Printing was accomplished by using a computer-controlled ink jet printer. Several types of large format ink jet printers are available such as the one manufactured by Encad, such as the Encad Novajet Pro Printer are acceptable. Other similar printers are available such as the Hewlett Packard Design Jet 2000, which is a cartridge color ink jet printer, accommodating papers or substrates up to 36" wide and with color resolution up to 600 dpi. These printers are thermal which require heating the ink. Piezo technology printers are relatively new and may also be used. The desired image is applied with the nonperforated vinyl backing preventing "spray through" of the ink because of its absorbency. After the image is applied, the substrate is ready for application. At the point of application, the perforated release liner and the nonperforated backing are removed and the substrate may be applied directly to a surface such as a window.

EXAMPLE 2

A top-coated polyester, again Photomatte Waterproof-PMW available from Sumner & Taylor of the SIHL Group was utilized. The substrate was perforated, again using conventional perforating dies to apply a distinct hole pattern as for example 1/16" diameter holes staggered at 3/32".

Again, perforating one side of the substrate was coated with an adhesive and a nonperforated release liner was laminated over the adhesive.

The image is then applied again using an inkjet printer such as the Hewlett Packard Design Jet 750C large format printer. The latter example is less expensive to manufacture than that described in Example 1 as it utilizes a single nonperforated liner which is removed at the time of application.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A method for producing a one-way see-thru panel assembly comprising:
    (a) providing an opaque light colored substrate having opposite first and second surfaces;
    (b) applying a dark pigmented adhesive to the first surface of said substrate;
    (c) applying a release liner over said adhesive;
    (d) top coating said second surface with an inkjet ink encapsulating substance;
    (e) perforating the top-coated substrate and release liner with a distinct hole pattern;
    (f) applying an imperforate barrier over the release liner; and
    (g) applying an image to the second surface by using an ink jet applicator.

2. The method of claim 1 wherein said substrate is selected from the group consisting of polyesters, vinyl and polyolefin films.

3. The method of claim 1 wherein said top coating is selected from the group consisting of clays, gels, resins and latex combination coatings.

4. A method of producing signage for application to a transparent surface comprising:
    (a) providing a polymeric light colored opaque substrate having opposite first and second surfaces;
    (b) applying a pigmented adhesive to the first surface;
    (c) applying a release liner over said adhesive;
    (d) top coating said second surface with an inkjet ink encapsulating substance;
    (e) perforating the top-coated substrate and release liner with a distinct hole pattern;
    (f) laminating an imperforate barrier over the release liner;
    (g) applying an image to the second surface by using an inkjet applicator;
    (h) removing the barrier and release lining to expose the adhesive; and
    (i) contacting the adhesive with said transparent surface.

5. The method of claim 4 wherein said ink jet applicator applies an ink selected from the group consisting of dye based ink, pigmented ink and solvent based inks.

6. The method of claim 4 wherein said inkjet applicator is a piezo ink jet applicator.

7. The method of claim 4 wherein said inkjet applicator is a thermal ink jet applicator.

8. A method of producing printable signage material for application to a transparent surface, said method comprising:
    (a) providing a plastic substrate having opposite first and second surfaces, said first surface being light colored and said second surface being dark colored;
    (b) applying an ink encapsulating ink receptive coating to said first surface;

(c) perforating said substrate to provide see through visibility when viewed from said second surface; and (d) applying an image to said first surface by ink jet application.

9. The method of claim 8 wherein said substrate is selected from the group consisting of polyester, vinyl and polyolefin films.

10. The method of claim 8 wherein said coating is selected from the group consisting clays, gels, resins and latex combination coatings.

11. The method of claim 8 including the additional step of applying an adhesive and release liner to said second surface.

\* \* \* \* \*

(12) EX PARTE REEXAMINATION CERTIFICATE (9654th)
United States Patent
Nelson

(10) Number: US 7,018,501 C1
(45) Certificate Issued: May 15, 2013

(54) ONE-WAY SEE-THRU PANEL AND METHOD OF MAKING SAME

(76) Inventor: Stephen G. Nelson, Phoenix, AZ (US)

Reexamination Request:
No. 90/012,581, Sep. 14, 2012

Reexamination Certificate for:
Patent No.: 7,018,501
Issued: Mar. 28, 2006
Appl. No.: 10/812,649
Filed: Mar. 29, 2004

Related U.S. Application Data

(63) Continuation of application No. 09/899,688, filed on Jul. 5, 2001, now abandoned.

(51) Int. Cl.
*B32B 37/00* (2006.01)
*G09F 21/04* (2006.01)
*B32B 37/12* (2006.01)
*B32B 38/00* (2006.01)
*C08K 3/34* (2006.01)

(52) U.S. Cl.
CPC ............... *G09F 21/04* (2013.01); *B32B 37/12* (2013.01); *B32B 38/145* (2013.01); *C08K 3/346* (2013.01)

USPC ........... 156/253; 156/252; 156/268; 156/278; 156/280

(58) Field of Classification Search
None
See application file for complete search history.

(56) References Cited

To view the complete listing of prior art documents cited during the proceeding for Reexamination Control Number 90/012,581, please refer to the USPTO's public Patent Application Information Retrieval (PAIR) system under the Display References tab.

*Primary Examiner* — Norca L Torres Velazquez

(57) ABSTRACT

A see-through, one-way panel having a white opaque substrate with a dark pigmented adhesive on the rear side. The pigmented adhesive is covered with a release liner. The substrate, adhesive and liner are perforated and thereafter an imperforate barrier is laminated over the release liner. The front surface may be top coated to accept a dye based ink. The front surface is printed with an image by thermal or piezo ink jet printing technology. The resulting panel may then be adhesively applied to a surface.

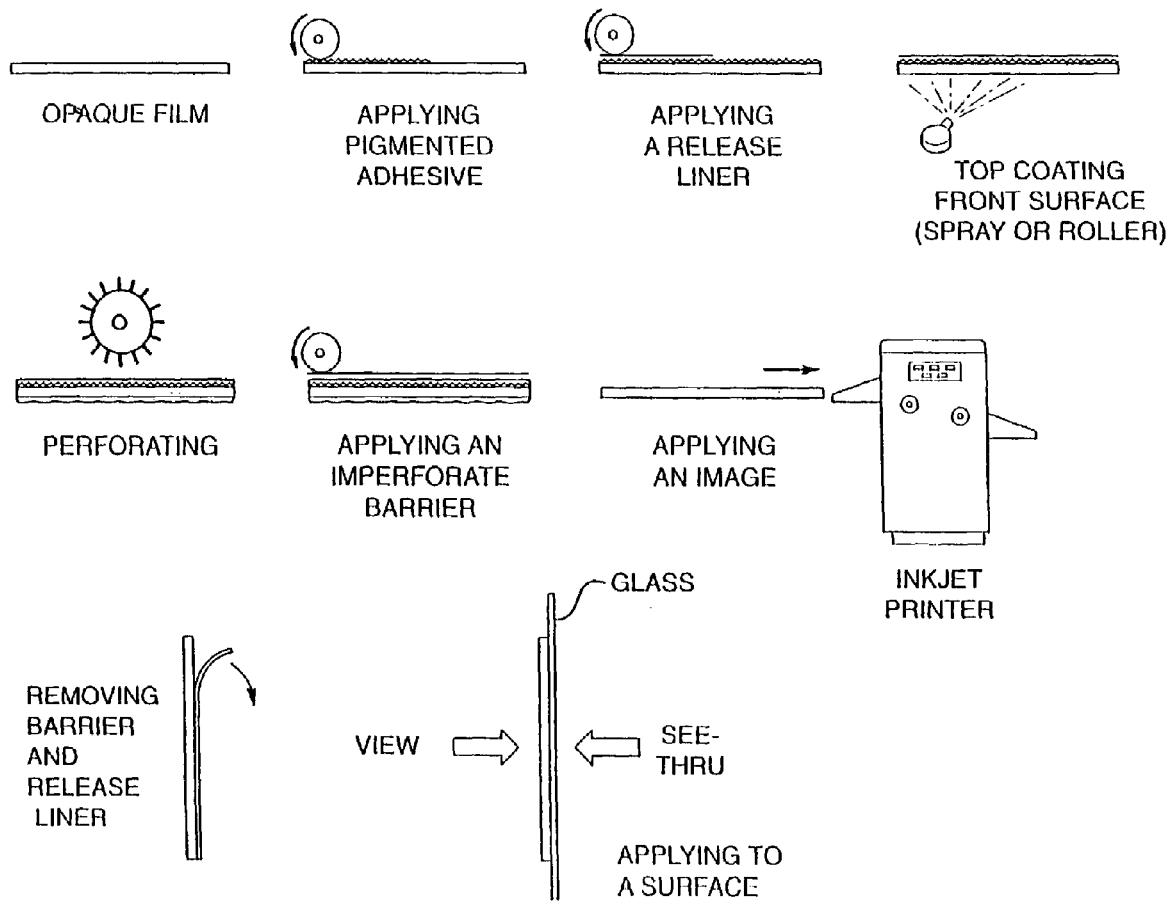

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

\* \* \* \* \*